(12) United States Patent
Fellman

(10) Patent No.: US 6,503,596 B1
(45) Date of Patent: Jan. 7, 2003

(54) COMPOSITE FIREWALL STRUCTURE

(76) Inventor: Michael L. Fellman, 136 Wright Brothers Ave., Livermore, CA (US) 94550

(*) Notice: Subject to any disclaimer, the term of this patent is extended or adjusted under 35 U.S.C. 154(b) by 208 days.

(21) Appl. No.: 09/727,795

(22) Filed: Nov. 30, 2000

(51) Int. Cl.$^7$ .................................................. B32B 3/12
(52) U.S. Cl. .................. 428/116; 428/408; 428/73; 428/921; 52/793.1
(58) Field of Search ........................... 428/116, 73, 408, 428/920, 921, 117, 118; 52/793.1

(56) References Cited

U.S. PATENT DOCUMENTS

| | | |
|---|---|---|
| 4,255,483 A | 3/1981 | Byrd et al. |
| 4,522,673 A | 6/1985 | Fell et al. |
| 4,567,076 A | 1/1986 | Therrien |
| 4,595,714 A | 6/1986 | McAllister et al. |
| 4,656,095 A | 4/1987 | McAllister et al. |
| 4,659,624 A | 4/1987 | Yeager et al. |
| 4,767,656 A | 8/1988 | Chee et al. |
| 5,015,522 A | 5/1991 | McCullough, Jr. et al. |
| 5,024,877 A | 6/1991 | McCullough, Jr. et al. |
| 5,470,633 A | 11/1995 | Darfler |
| 5,527,584 A | 6/1996 | Darfler et al. |
| 5,558,932 A | 9/1996 | Scanlon |
| 6,013,361 A | 1/2000 | Seal et al. |

*Primary Examiner*—Deborah Jones
*Assistant Examiner*—Wendy Boss
(74) *Attorney, Agent, or Firm*—Theodore J. Bielen, Jr.

(57) ABSTRACT

A composite structure particularly useful as a firewall utilizing a sheet of carbon-carbon material formed with first and second, opposite, sides. The first side of the sheet is subject to flame impingement. The sheet is formed in sufficient thickness to provide structural integrity and prevent the penetration of the flame from the first side to the second side for a 15-minute period where the flame temperature is 2,000° F.

9 Claims, 1 Drawing Sheet

COMPOSITE FIREWALL STRUCTURE

BACKGROUND OF THE INVENTION

The present invention relates to a novel and useful composite structure which is particularly useful as a firewall.

"Firewalls" or "fireproof walls" are widely employed in buildings and vehicles to separate potential sources of ignition from flammable liquids and vapors. Firewalls are particularly useful in vehicles such as aircraft and aerospace modules. With respect to aircraft, the United States Federal Aeronautics Administration requires "fire proof" barriers or walls between ignition sources and flammable liquids and/or vapors. The status of "fireproof" is defined as the capability of a material or component to withstand a 2,000° F. flame for 15 minutes without any flames being observed on the backside of the wall or barrier due to flame penetration. Examples of areas in aircraft that require firewalls are the engine power section, auxiliary power units, fuel-burning heaters, engines accessory sensors, and the like. Such areas are designated as "fire zones".

In the past, firewalls have been formed of stiffened metallic sheets, 15 to 20 mils in thickness. Stainless steel, titanium, and corrosion resistant steel have been used in this regard. Such metallic entities are heavy and are very poor insulators. In addition, spray-on coatings and blankets have also been used to clad surfaces, for providing insulation and protection. Such spray-on and blanket insulation systems are expensive, heavy, and are difficult to maintain and install.

Carbon based honeycombs have been recognized as exhibiting normal heat conductivity along a controlled direction. For example, U.S. Pat. Nos. 5,470,633 and 5,527,584 describe such honeycomb structures.

Other fire resistant materials have been proposed such as those found in U.S. Pat. No. 6,013,361, which describes a high performance laminate composite material utilizing a resin impregnating fiber. Such fiber may take the form of graphite.

U.S. Pat. Nos. 4,595,714 and 4,656,095 describe ablative coating compositions utilizing a mixture of epoxy, polysulfide resins, an amine curing agent, refractory fibers, and inorganic materials to form a glassy reaction product when exposed to heat, which provides thermal protection.

U.S. Pat. Nos. 5,015,522 and 5,024,877 show fire resistant carbonatous material mixed with polymeric material such as organosilicone polymer to increase fire resistance.

U.S. Pat. No. 4,255,483 describes fire barrier compositions and composites utilizing silica-containing material and a resin which is applied to a graphite fiber or cloth to form a composite structure which is flame resistant.

U.S. Pat. No. 5,558,932 describes a structural composite flame barrier which employs a structural polymer composite and a ceramic matrix which are adhered to one another to form an integrated structural panel.

U.S. Pat. No. 4,522,673 teaches a heat-insulating blanket where heat and fire resistant fabrics are placed on either side of a layer of insulating material to protect the same in high heat environments.

U.S. Pat. No. 4,767,656 describes a composite material possessing fire protection capability which utilizes polyimide resins in a woven ceramic fabric that surrounds the resin. The layers may be formed into a honeycomb.

U.S. Pat. No. 4,567,076 reveals a load bearing composite structure possessing thermal and flame resistance in which a honeycomb structure is sandwiched between plies, one of which is sewn together to a blanket and cured. The honeycomb is generally a glass fiber reinforced polyimide core while the blanket is generally formed of ceramic fabric.

U.S. Pat. No. 4,659,624 shows a carbon-carbon laminate which may be coded with fire resistant materials to provide protection in high temperature conditions for resistance to degradation by oxidation.

Carbon-carbon materials have been known for many years which retain strength and stiffness at high temperatures in an inert atmosphere. Carbon-carbon materials are generally resistant to thermal shock and creep. However, carbon-carbon materials have generally been excluded from oxidation environments at high temperatures, usually greater than 400° C.

A fireproof structure which is useful as a firewall and is light and strong would be an extraordinary advance in the field of structural materials.

BRIEF SUMMARY OF THE INVENTION

In accordance with the present invention a novel and useful fireproof composite structure, useable as a firewall, is herein provided.

The structure of the present invention utilizes a sheet of carbon-carbon material which is formed with a first side and an opposite second side. The sheet of material is of sufficient size and stiffness to provide structural integrity when used as a firewall. The first side of the sheet of material is subject to flame impingement, such that a flame possessing a temperature of about 2,000° F. on the first side will not penetrate the sheet and be observable on the second side over a 15-minute period. The sheet of carbon-carbon material may initially comprise a pan, pitch, rayon, or other carbon forming material which is densified, following pyrolysis, preferably by chemical vapor infiltration (CVI). The CVI process introduces a hydrocarbon gas into a chamber where the pyrolytic carbon is placed. At about 2,000° F., and at a pressure ranging from 500 to 3,000 Pa, densification takes place resulting in a sheet of carbon-carbon material which may possess a density in the range of 1–2 grams/cm$^3$.

In another embodiment of the present invention, multiple sheets such as first and second sheets or plies of carbon-carbon material are formed in the same manner with respect to the single sheet of carbon-carbon material. However the sheets are held or bonded to one another such that one side of one sheet of carbon-carbon material is exposed to the flame while the backside of another sheet of carbon-carbon material lies adjacent the flammable gas or liquid being protected by the firewall. Again, the first and second sheets of carbon-carbon material would exhibit sufficient structural integrity to serve as a firewall. Bonding between the sheets may take place by the use of an epoxy resin or other similar known adhesive compounds.

Yet another embodiment of the present invention utilizes first and second sheets of carbon-carbon material formed according to the hereinabove described process. However, a honeycomb of carbon-carbon material would lie between, and be bonded to, the first and second sheets to form a unit. One side of the first sheet of the unit would be subject to flame impingement while another side of the second sheet of the unit sandwiching the honeycomb core would lie adjacent the flammable materials being protected by the firewall.

In any case, the structures of the present invention would be subject to a flame at 2,000° F. which is incapable of penetrating the sheet, laminate, or unit over a 15 minute period, such that the flame is not observable on the backside of any of the structures of the present invention hereinabove described.

It may be apparent that a novel and useful fire proof composite structure, useable as a firewall has been hereinabove described.

It is therefore an object of the present invention to provide a fireproof composite structure useable as a firewall which provides thermal and flame protection and is rated as fire proof according to standard tests.

Another object of the present invention is to provide a fireproof composite structure useable as a firewall which is of a very low density and possesses very high stiffness.

A further object of the present invention is to provide a fireproof composite structure which is useable as a firewall that may be substituted for presently constructed firewalls in aircraft and aerospace vehicles.

Yet another object of the present invention is to provide a fireproof composite structure which is useable as a firewall that eliminates the need for auxiliary insulation and allows heat sensitive materials, such as wiring, to lie very close to the backside of the firewall opposite impingement of a flame.

Another object of the present invention is to provide a fireproof composite structure which is useable as a firewall and eliminates the need for reinforcing or stiffening structures, thus, reducing the cost and complexity of the structure.

The invention possesses other objects and advantages especially as concerns particular characteristics and features thereof which will become apparent as the specification continues.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be taken in conjunction with the hereinabove delineated drawings.

Figure 1:
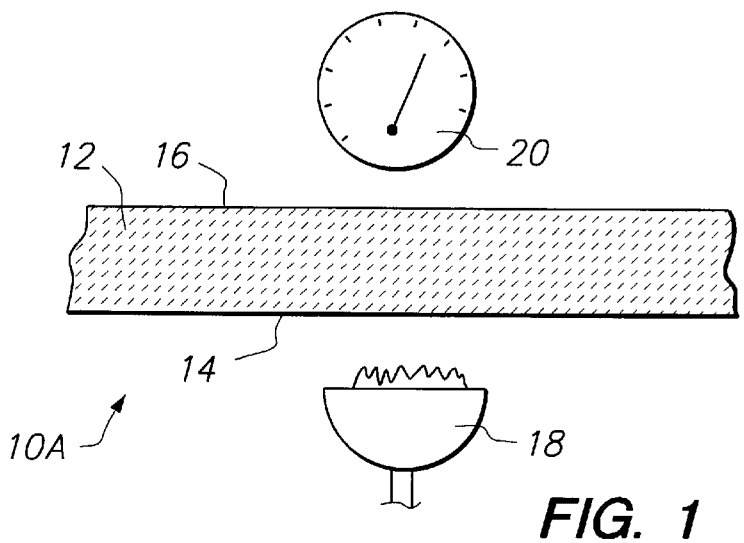
FIG. 1 is a sectional view of the first embodiment of the present invention in combination with a typical apparatus, schematically depicted determining a fireproof rating.

The invention as a whole is shown in the drawings by reference character 10, followed by an upper case letter to distinguish the embodiments of the invention. With reference to FIG. 1, structure 10A is shown which is a fireproof entity that may be used as a firewall. Structure 10A comprises a sheet of carbon-carbon material 12 having a first side 14. First side 14 is intended to be subject to flame impingement depicted by flame source 18. Second side 16 may be referred to as the "backside" and would protect flammable liquids and gases, such as those existing in a vehicle, e.g., an aircraft. Temperature gauge 20 records the backside temperature. Typically a test to determine whether sheet 10A is fireproof would span a period of 15 minutes. If the flame from flame source 18 does not penetrate sheet 12, such that it is observable on side 16 after such 15 minutes, sheet 12 is classified as being "fireproof".

The carbon-carbon material found in sheet 12 is formed by known processes. Generally, the carbon-carbon forming process begins with carbon fibrous material in the form of a sheet. The sheet is subject to pyrolysis at a temperature of approximately 2,000° F. The carbon fiber or resin is converted to a carbon char of high porosity. Following pyrolysis, the carbon char is redensified using a chemical vapor infiltration (CVI) process where a mixture of hydrocarbon gases are injected into a high temperature furnace at about 2,000–3,000° F. The gases "crack" and deposit carbon into the pores of the carbon char to form a carbon-carbon material. Also, variations of CVI processes may be employed including ones known as isothermal, thermal gradient, pressure gradient, rapid densification, and other modifications and combinations which are known in the art. Densification generally takes place over period of 100 to 1,000 hours.

Figure 2:
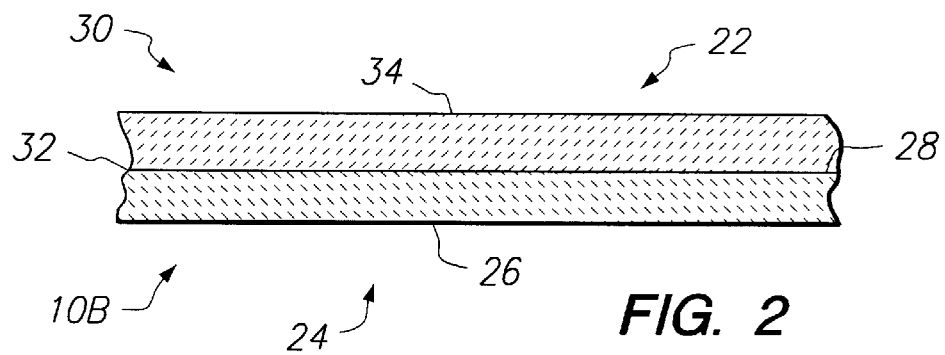
FIG. 2 is a sectional view of the second embodiment of the present invention.

Turning to FIG. 2, it may be observed that a second embodiment 10B of the present invention is depicted. A multi-ply panel 22 is shown and includes a first sheet 24 having a first side 26 and a second side 28. The second sheet 30 possesses a first side 32 and a second side 34. Second side 28 of first sheet 24 is bonded to first side 32 of second sheet 30 by the use of known adhesive compounds and methods. For example, a phenolic resin may be employed. Panel 10B is formed with sheets 24 and 30, using initial by pan, pitch, or another type of carbon and transformed into a carbon-carbon panel by the process described with respect to embodiment 10A of FIG. 1. It should be noted that side 26 of panel 10B is intended to be exposed to a flame when in use as a firewall.

Figure 3:
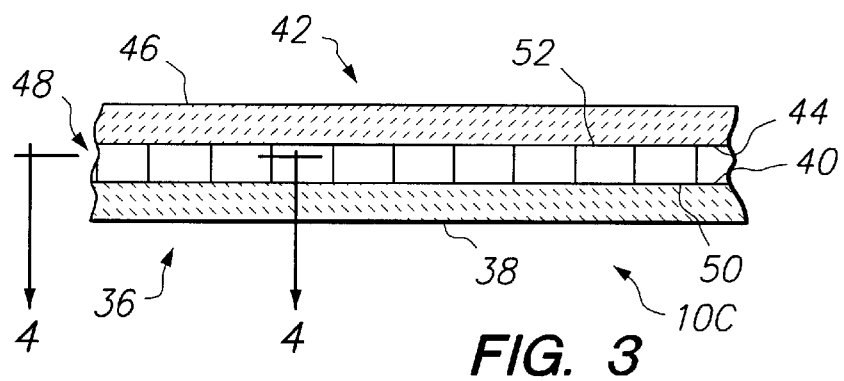
FIG. 3 is a sectional view of the third embodiment of the present invention.
Figure 4:
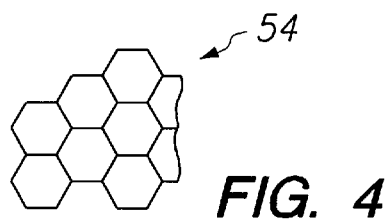
FIG. 4 is a sectional view taken along line 4—4 of FIG. 3.

With respect to FIG. 3, a third embodiment 10C of the structure of the present invention is depicted. Panel 10C is formed with a first sheet 36 having a first side 38 and a second side 40. Second sheet 42 includes a first side 44 and a second side 46. Honeycomb core 48 is also employed and includes a first side 50 and a second side 52. Again, panel 36 is formed using pan, pitch, or other carbon material and then converted into a carbon-carbon material using the process described in detail with respect to embodiment 10A of FIG. 1. Panel 48 includes a plurality of honeycombs 54 which add to the structural integrity of panel 36.

In operation, embodiments 10A, 10B, or 10C are employed as a firewall following formation in an aircraft or aerospace vehicle. Structures 10A, 10B, or 10C may vary in thickness but may range from 3 to 1,000 mils. In certain cases, other thicknesses may be employed. It is intended that structures 10A, 10B, or 10C may possess the same thickness as metallic firewalls in the prior art such that direct replacement of metallic sheet firewalls by any of the embodiments 10A, 10B, or 10C of the present invention would not require design changes in an aerospace or aircraft vehicle during installation.

The following working example represents a typical firewall structure of the present invention and is not intended to limit the scope of the disclosure or claims of the invention.

EXAMPLE 1

A carbon-carbon panel similar to panel 36 of FIG. 3 was constructed utilizing a core of ⅜=0 inch hexagonal cells. The sheets or skins surrounding the core were formed from pitch carbon, fiber which was also preimpregnated with a phenolic resin. The core took the form of an essentially flat laminate. Face sheets were bonded to the core using an epoxy resin designated as RS-11. The panel possessed a density of 5.15 pounds per cubic foot and was preimpregnated with a phenolic resin. Following formation of the panel, the panel was transformed into a carbon-carbon material by pyrolysis at approximately 2,000° F. and redensification using a CVI procedure at approximately 3,000° F. The panel was then subjected to the Power Plant Fire Penetration test under Chapter 12 of the FAA Handbook, by the Govmark Organization, Inc. in Farmingdale, N.Y. The subject test flame was precalibrated to achieve an operating temperature of 2,000° F. and a minimum heat flux of 9.3 $BTU/fT^2$/sec. It was also noted that 3.5 inches between the burner cone and the face of the test specimen, the recorded flux value actually was measured at 11.3 $BTU/fT^2$/sec. The tests panel was exposed to the test flame for a period of 15 minutes. The backside of the specimen was observed to determine evidence of flame penetration. After 5 minutes, the backside temperature of the panel was measured as 684° F. No flame penetration was observed.

After 15 minutes, the backside temperature was measured at 684° F. and no flame penetration was observed. The panel was tested in a static condition such that critical operating loads and environmental conditions were not simulated. Based on the tests, the panel was classified as "Fire Proof".

While in the foregoing, embodiments and examples of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A composite structure which is fireproof, comprising:
   a. a sheet of carbon-carbon material formed with a first side and an opposite second side, said first side being subject to flame impingement, said sheet being of sufficient size to provide structural integrity as a firewall, said sheet further preventing a flame, possessing a temperature of about 2,000° F. on said first side from penetration said sheet and being observable on said second side, over a 15 minute period.

2. The structure of claim 1 in which said sheet of carbon-carbon material comprises pan carbon fibers densified with carbon by chemical vapor infiltration.

3. The structure of claim 1 in which said sheet of carbon-carbon material comprises pitch carbon fibers densified with carbon by chemical vapor infiltration.

4. A composite structure which is fireproof, comprising:
   a. a first sheet of carbon-carbon material formed with a first side and an opposite second side, said first side being subject to flame impingement; and
   b. a second sheet of carbon-carbon material formed with a first side and an opposite second side, said first side of said second sheet of carbon-carbon material being bonded to said second side of said first sheet of carbon-carbon material, said first and second sheets of carbon-carbon material being of sufficient size to provide structural integrity for use as a firewall, said first and second sheets further preventing a flame, possessing a temperature of about 2,000° F. on said first side of said first sheet, from penetrating said first and second sheets and being observable on said second side of said second sheet over a 15 minute period.

5. The structure of claim 4 in which said first and second sheets of carbon-carbon material comprises pan carbon fibers densified with carbon by chemical vapor infiltration.

6. The structure of claim 4 in which said first and second sheets of carbon-carbon material comprises pitch carbon fibers densified with carbon by chemical vapor infiltration.

7. A composite structure which is fireproof, comprising:
   a. a first sheet of carbon-carbon material formed with a first side and an opposite second side, said first side being subject to flame impingement;
   b. a second sheet of carbon-carbon material formed with a first side and a second side;
   c. a honeycomb core of carbon-carbon material, said honeycomb material being formed with a first side and a second side, said second side of said first sheet of carbon-carbon material being bonded to said first side of said honeycomb core, said second side of said honeycomb core being bonded to said first side of said second sheet to form a unit, said unit being of sufficient size to provide structure integrity as a firewall; said unit possessing a temperature of about 2,000° F. on said first side of said first sheet, from penetrating said unit and being observable on said second side of said second sheet, over a 15 minute period.

8. The structure of claim 7 in which said unit of carbon-carbon material comprises pan carbon fibers densified with carbon by chemical vapor infiltration.

9. The structure of claim 7 in which said unit of carbon-carbon material comprises pitch carbon fibers densified with carbon by chemical vapor infiltration.

* * * * *